United States Patent
Bieltz et al.

(10) Patent No.: US 9,056,598 B2
(45) Date of Patent: Jun. 16, 2015

(54) METHOD FOR SETTING THE ACTUATING FORCE APPLIED BY A PARKING BRAKE

(75) Inventors: Karsten Bieltz, Mudelsheim (DE); Simon Hauber, Freiberg Am Neckar (DE)

(73) Assignee: ROBERT BOSCH GMBH, Stuttgart (DE)

(*) Notice: Subject to any disclaimer, the term of this patent is extended or adjusted under 35 U.S.C. 154(b) by 153 days.

(21) Appl. No.: 13/991,448

(22) PCT Filed: Dec. 8, 2011

(86) PCT No.: PCT/EP2011/072223
§ 371 (c)(1),
(2), (4) Date: Aug. 14, 2013

(87) PCT Pub. No.: WO2012/080085
PCT Pub. Date: Jun. 21, 2012

(65) Prior Publication Data
US 2013/0325278 A1  Dec. 5, 2013

(30) Foreign Application Priority Data
Dec. 17, 2010 (DE) .......... 10 2010 063 359

(51) Int. Cl.
G06F 7/70 (2006.01)
B60T 8/17 (2006.01)
B60T 7/10 (2006.01)
B60T 13/58 (2006.01)
B60T 13/74 (2006.01)
B60T 17/22 (2006.01)

(52) U.S. Cl.
CPC . *B60T 8/17* (2013.01); *B60T 7/107* (2013.01); *B60T 13/588* (2013.01); *B60T 13/741* (2013.01); *B60T 13/745* (2013.01); *B60T 13/746* (2013.01); *B60T 17/22* (2013.01); *B60T 13/58* (2013.01)

(58) Field of Classification Search
CPC ...... B60T 8/265; B60T 13/741; B60T 17/221
USPC ............ 701/70, 3, 33.8, 50, 67; 188/158, 159
See application file for complete search history.

(56) References Cited

U.S. PATENT DOCUMENTS

| | | | |
|---|---|---|---|
| 4,658,939 A * | 4/1987 | Kircher et al. ................ | 188/156 |
| 2002/0020591 A1 * | 2/2002 | Schanzenbach et al. ..... | 188/158 |
| 2006/0261764 A1 * | 11/2006 | Erben et al. .................. | 318/139 |
| 2012/0205202 A1 * | 8/2012 | Baehrle-Miller et al. . | 188/106 P |
| 2013/0325278 A1 * | 12/2013 | Bieltz et al. ................. | 701/70 |

FOREIGN PATENT DOCUMENTS

| | | |
|---|---|---|
| CN | 200995677 | 12/2007 |
| CN | 101835665 | 9/2010 |
| DE | 19853721 | 6/1999 |
| DE | 102009028505 | 2/2001 |
| DE | 10035220 | 1/2002 |
| DE | 10361042 | 5/2005 |
| GB | 2156021 | 10/1985 |

OTHER PUBLICATIONS

International Search Report, dated Apr. 24, 2012, issued in corresponding PCT Application No. PCT/EP2011/072223, 3 pages.

* cited by examiner

*Primary Examiner* — Redhwan K Mawari
(74) *Attorney, Agent, or Firm* — Kenyon & Kenyon LLP

(57) ABSTRACT

In a method for setting the clamping force applied by a parking brake, which is generated by an electromechanical brake device and additionally by a hydraulic brake device as needed, the hydraulic pressure is ascertained, and the pressure is assigned a pressure reference path which is compared with an actuator path.

9 Claims, 2 Drawing Sheets

METHOD FOR SETTING THE ACTUATING FORCE APPLIED BY A PARKING BRAKE

CROSS REFERENCE TO RELATED APPLICATIONS

The present application is the national stage entry of International Patent Application No. PCT/EP2011/072223, filed on Dec. 8, 2011, which claims priority to Application No. DE 10 2010 063 359.3, filed in the Federal Republic of Germany on Dec. 17, 2010.

FIELD OF INVENTION

The present invention relates to a method for setting the clamping force applied by a parking brake in a vehicle.

BACKGROUND INFORMATION

An electromechanical parking brake is described in German Application No. DE 103 61 042 B3, whose actuator is designed as an electric brake motor. During actuation of the brake motor, a brake piston including a brake pad is moved axially against the end face of a brake disk. The amount of electromechanical braking force is set by energizing the brake motor.

It is furthermore known to couple an electromechanical parking brake with a hydraulic vehicle brake by additionally applying the pressure of the hydraulic vehicle brake to the brake piston of the parking brake. The full clamping force to be provided includes, in this case, an electromechanical portion and a hydraulic portion. The hydraulic pressure is provided as needed and in addition to the electromechanical clamping force portion. To precisely set the clamping force, it is therefore necessary to know the hydraulic clamping force support as accurately as possible.

SUMMARY

An object of the present invention is to provide the clamping force of a parking brake having a mechanical brake device, including additional hydraulic support, with a sufficient degree of accuracy, by using simple means.

The method according to the present invention may be used for electromechanical parking brakes in vehicles which have an electric actuator for generating a clamping force for the purpose of holding the vehicle at a standstill. The electric actuator is preferably an electric brake motor whose rotational movement is converted into an axial actuating movement of a brake piston which is the carrier of a brake pad and which is pressed against the end face of a brake disk. In principle, however, other designs of electromechanical brake devices are also possible, for example electromagnetic actuators.

A hydraulic brake device, whose hydraulic pressure is supportively present at the brake piston, is used for clamping force support, so that the total clamping force includes an electromotively generated portion and a hydraulically generated portion. The hydraulic brake device is preferably the regular vehicle brake. The hydraulic clamping force is generated as needed and in addition to the electromechanical clamping force.

The driver may generate a hydraulic admission pressure in the brake system by actuating the brake pedal at the point in time at which an electromechanical clamping force is generated. The admission pressure may result in a virtual shifting, in particular, of a force increase point during the course of the generated clamping force, which causes the parking brake to assume a higher effective clamping force than is actually the case. This results in a correspondingly reduced actuation of the electric actuator of the electromechanical brake device and thus causes an excessively low clamping force level to be set.

To correctly detect the influence of the hydraulic admission pressure and to take any compensating measures that may be necessary, a comparison is made between a pressure reference path, which corresponds to the hydraulic pressure instantaneously prevailing in the system, and an actuator path of the electric actuator, which is ascertained from a motor state variable of the actuator. If the comparison shows that the pressure reference path and the actuator path deviate significantly from each other, it must be assumed that the information about the hydraulic pressure in the system is not sufficiently trustworthy. In the case of a measured pressure, in particular, an insufficient plausibility must be assumed if the pressure reference path deviates from the actuator path. In this case, the hydraulic portion of the clamping force is not taken into account, and the total clamping force is fully provided by the electromotive brake device, regardless of any hydraulic clamping force.

If, in contrast, the comparison shows that the pressure reference path and the actuator path coincide with an adequate degree of accuracy, a sufficient plausibility of the pressure signal may be assumed, and the hydraulic clamping force portion may be taken into account when providing the total actuating force. In this case, the electromechanical clamping force portion is reduced accordingly.

To determine the pressure reference path, the hydraulic pressure instantaneously active in the hydraulic brake system must be ascertained either by a measurement or in an estimating method. The actuator path, in contrast, is ascertained from a motor state variable of the electric actuator, which is also either measured or ascertained according to an estimating method. In particular, the current received by the actuator, the applied voltage and/or the rotational speed may be used as motor state variables on which the ascertainment of the actuator path is based.

The actuator path is ascertained between two characteristic reference points. For example, it is advantageous to ascertain a free travel in the actuator actuating movement which the actuator completes between a first reference point and a force increase point, at which the force increase of the electromechanical clamping force begins. The first reference point coincides, for example, with the stopping point of the actuator in the retracted out-of-operation state. The force increase point may be relatively easily ascertained as the distinctive point in the curve of the motor state variables. In particular, the current curve of an electric brake motor corresponds to the force curve of the provided electromechanical clamping force, so that the force increase point may be inferred from the rise in the current curve, starting from a no-load current, during clamping or closing of the electromechanical brake device. The force increase point corresponds to the no-load point, since the electric actuator does not yet transmit any clamping force until this point is reached.

The free travel of the actuator ascertained in this way is compared with an assigned pressure reference path, which results from a characteristic curve which shows the correlation between the pressure present in the system and the assigned path which the hydraulic brake device must complete to generate this pressure. According to a further advantageous embodiment, the pressure reference path is ascertained from the free travel of the actuator during the opening movement and a differential movement in the presence of the pressure. The free travel of the actuator during the opening movement is determined from the motor state variables, as described above. The differential movement in the presence of the pressure is preferably determined during the closing movement of the actuator. The actuator path used for comparison is also ascertained during the closing of the electromechanical brake device.

A link is obtained in this way between the releasing or opening movement and the closing or clamping movement of the electric actuator, in which the influence of the hydraulic admission pressure is taken into account which is generated by the driver actuating the brake pedal during the closing movement of the actuator. As described above, this admission pressure may result in a shifting during the course of the clamping force, with the result that the parking brake assumes a higher effective clamping force than is actually the case. The comparison between the actual actuator path and the assigned pressure reference path may be used to establish whether the amount of admission pressure must be taken into account when providing the clamping force or whether the pressure signal is plausible.

The method according to the present invention runs in a regulating or control unit in the vehicle, which may be part of the parking brake system.

Additional advantages and exemplary embodiments are described in the following with reference to the accompanying drawings.

DETAILED DESCRIPTION

Figure 1:
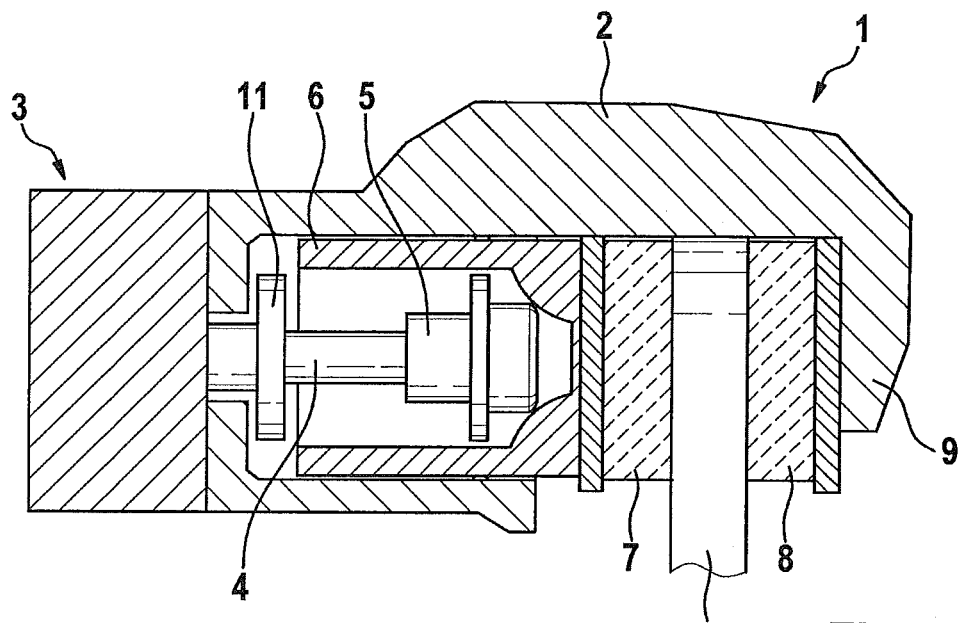
FIG. 1 shows a section of an electromechanical parking brake for a vehicle, in which the clamping force is generated with the aid of an electric brake motor.

FIG. 1 shows an electromechanical parking brake 1 for holding a vehicle at a standstill. Parking brake 1 includes a brake caliper 2 having a clamp 9 which grips a brake disk 10. As the actuator, parking brake 1 has an electric motor as brake motor 3, which rotationally drives a spindle 4 on which a spindle component 5 is rotatably mounted. When spindle 4 rotates, spindle component 5 is axially adjusted. Spindle component 5 moves within a brake piston 6, which is the carrier of a brake pad 7 which is pressed against brake disk 10 by brake piston 6. Another brake pad 8, which is fixedly held in place on clamp 9, is located on the opposite side of brake disk 10.

During a rotational movement of spindle 4, spindle component 5 may move axially forward within brake piston 6 in the direction of brake disk 10 or, in a reversed rotational movement of spindle 4, it may move axially backward until it reaches a stop 11. To generate a clamping force, spindle component 5 strikes the inner end face of brake piston 6, whereby axially movable brake piston 6, which is mounted in parking brake 1, is pressed against the facing end face of brake disk 10 by brake pad 7.

If necessary, the parking brake may be supported by a hydraulic vehicle brake in such a way that the clamping force includes an electromotive portion and a hydraulic portion. During the hydraulic support, pressurized hydraulic fluid is applied to the back of brake piston 6 facing the brake motor.

Figure 2:
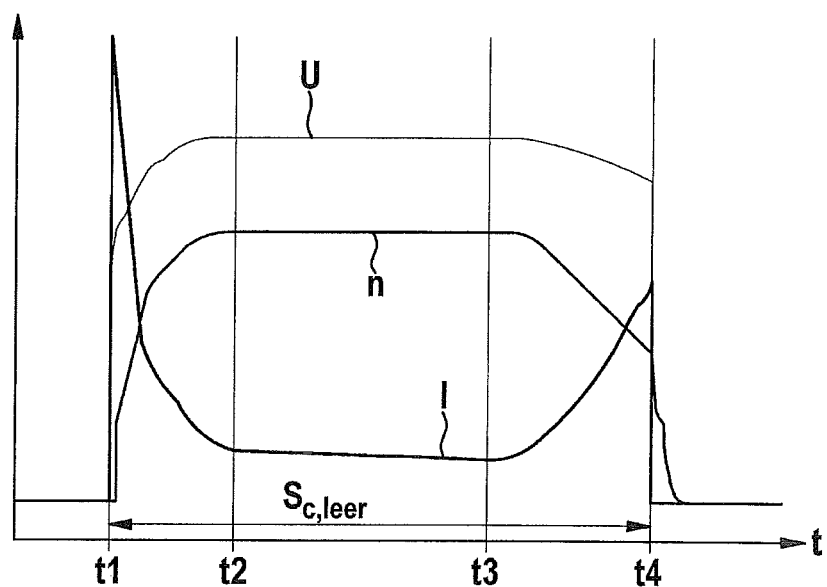
FIG. 2 shows a diagram of the time-dependent curve of the current, the voltage and the motor speed during the clamping operation of the parking brake.

FIG. 2 shows a diagram of current curve I, voltage U and rotational speed curve n of the electric motor as a function of time for a clamping operation. At point in time t1, the clamping operation begins by an electric voltage being applied and the brake motor being energized while the circuit is closed. At point in time t2, voltage U and motor speed n have reached their maximum values. The phase between t1 and t3 is the no-load phase in which current I has a minimum level. Starting at point in time t3, the force buildup phase follows until point in time t4, in which the brake pads rest against the brake disk and are pressed against the brake disk under increasing clamping force F. At point in time t4, the electric brake motor is turned off by opening the circuit, so that rotational speed n of the brake motor drops to zero during the further progression.

The force increase point coincides with the force buildup phase at point in time t3. The force buildup or curve of clamping force F may be ascertained, for example, on the basis of the curve of current I of the brake motor, which has, in principle, the same curve as the electromechanical clamping force. Starting from the low level during the no-load phase between t2 and t3, the current curve rises steeply at the beginning of point in time t3. This current rise may be detected and used to determine the force increase point. However, the force buildup curve may, in principle, also be determined from the voltage or rotational speed curve or from any combination of the current, voltage and rotational speed signals.

FIG. 2 shows the course of the curves as a function of time. Using a piece of path information ascertained, for example, by sensors, the time-dependent curve may be converted into a path-dependent curve.

The path traveled by the spindle component or the brake piston between points in time t1 and t3 in the direction of actuation corresponds to free travel $s_{c,free}$ of the actuator during the closing or clamping operation. At point in time t1, the electric brake motor is in its axially retracted stop position; at point in time t3, it is in its force transmission position moved forward in the direction of the brake disk.

Figure 3:
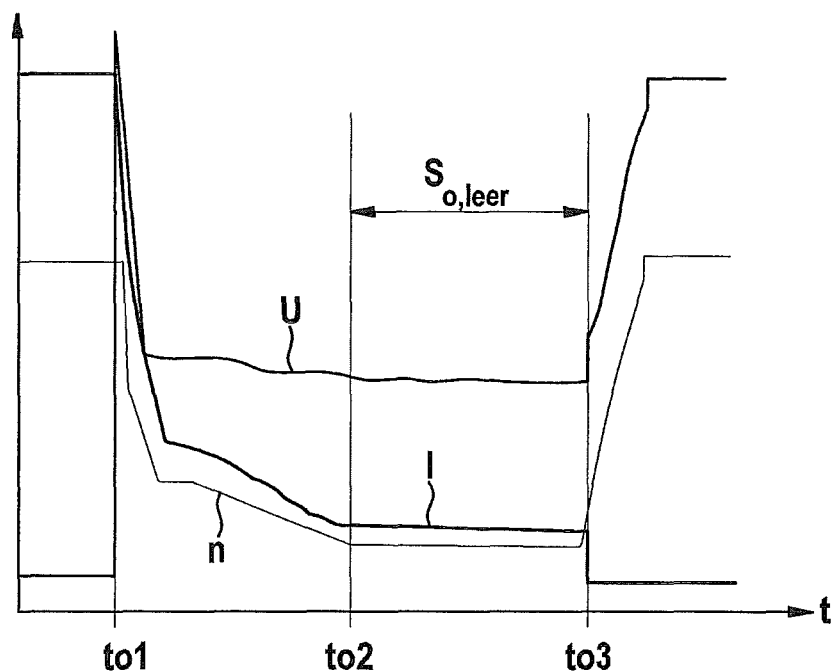
FIG. 3 shows a diagram of the time-dependent curve of the current, the voltage and the motor speed during the release of the parking brake.

FIG. 3 shows another diagram of the course of the curves of current I, voltage U and rotational speed n during the opening operation of the brake motor, in which the brake piston is retracted. At point in time to1, the opening operation begins and the brake piston adjusted by the electric brake motor is retracted axially from the brake disk. At point in time t02, the no-load state is reached, and no more electromechanical clamping force is transmitted. At point in time to3, the electric brake motor or the brake piston adjusted by the brake motor has reached its axially retracted stop position. The no-load point at point in time to2 corresponds to the force increase point at point in time t3 in FIG. 2. The path traveled between points in time to2 and to3 corresponds to free travel $s_{o,free}$ during the opening operation.

Figure 4:
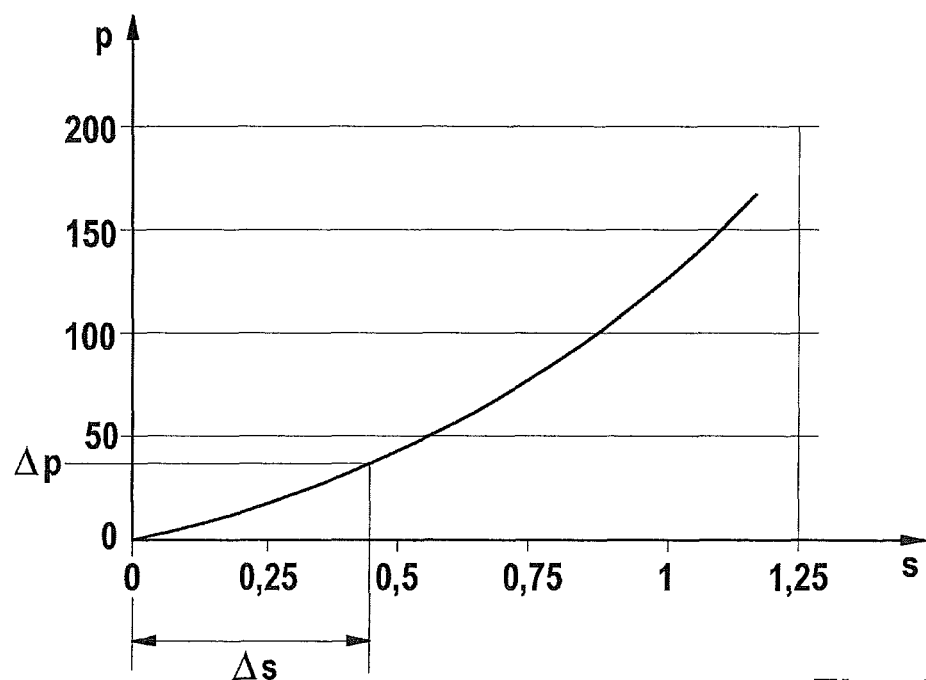
FIG. 4 shows a pressure path diagram.

FIG. 4 shows a pressure path diagram of the hydraulic brake device. Based on this correlation, an assigned path may be inferred from an ascertained pressure in the hydraulic brake device. For example, a pressure difference $\Delta p$ may be assigned to a path difference $\Delta s$, which corresponds to a shifting of the brake piston and consequently to a change in the volume available for the hydraulic fluid. Pressure $\Delta p$ is, for example, the admission pressure in the brake system, which is generated by the driver actuating the brake pedal, during the clamping operation of the parking brake.

In the method for establishing the plausibility of the pressure value, free travel $S_{o,free}$ between point in time to2, at which the no-load state exists, and point in time to3, at which the maximum retracted position is reached, is first determined during an opening operation of the parking brake (FIG. 3). At the same time, the pressure or admission pressure prevailing in the hydraulic system is measured or estimated.

During a subsequent clamping operation of the parking brake (FIG. 2), free travel $s_{c,free}$ of the actuator is determined between point in time t1, at which the clamping operation begins, and point in time t3, which corresponds to the force increase point. Free travel $s_{c,free}$ of the actuator during the closing or clamping operation is subsequently compared with a pressure reference value $s_{p,ref}$, which arises according to $$s_{p,ref} = S_{c,free} + \Delta s(\Delta p)$$

from actuator free travel $s_{o,free}$ during the opening operation and differential movement $\Delta s$ at corresponding pressure or admission pressure $\Delta p$. Taking tolerances into account, actuator free travel $s_{c,free}$ must coincide with pressure reference path $s_{p,ref}$ during the closing operation, so that a plausibility of the ascertained pressure may be assumed. Only in this case is the hydraulic portion also taken into account during provision of the clamping force, so that the electromechanical braking force to be provided by the electric brake motor is reduced by a corresponding portion. If, in contrast, actuator free travel $s_{c,free}$ does not coincide with pressure reference value $s_{p,ref}$ with a sufficient degree of accuracy during the closing operation, the hydraulic pressure during the closing operation is not taken into account, and the total clamping force must be provided by the electric brake motor.

What is claimed is:

1. A method for setting a clamping force applied by a parking brake of a brake system, which clamping force is at least partially generated by an electromechanical brake device that includes an electric actuator and additionally by a hydraulic brake device as needed, a hydraulic pressure being supportively active at a brake piston when the hydraulic brake device is actuated, the brake piston being adjusted by a total clamping force composed of an electromechanical clamping force generated by the electric actuator and a hydraulic clamping force generated by the hydraulic brake device, the method comprising:
    ascertaining, by a control unit of the brake system, the hydraulic pressure; and
    assigning, to the hydraulic pressure and by the control unit, a pressure reference path which is compared with an actuator path ascertained from a motor state variable of the actuator, the total clamping force being provided with aid of the electromechanical clamping force in an event that the pressure reference path and the actuator path deviate significantly from each other;
    wherein the actuator path corresponds to a free travel between a reference point, which coincides with a stopping point of the actuator in a retracted out-of-operation state, and a force increase point of the actuator.

2. The method as recited in claim 1, wherein the force increase point of the actuator is ascertained from at least one of a current, a voltage and a rotational speed of the actuator.

3. The method as recited in claim 1, wherein an electric brake motor is used as the actuator.

4. The method as recited in claim 1, wherein the pressure reference path is ascertained from a free travel of the actuator and a differential movement in a presence of a pressure.

5. The method as recited in claim 4, wherein the free travel of the actuator is ascertained during an opening of the actuator.

6. The method as recited in claim 1, wherein the actuator path is ascertained during a closing of the electromechanical brake device.

7. The method as recited in claim 1, wherein the pressure reference path is determined from a pressure path characteristic curve.

8. A regulating or control unit for carrying out a method for setting a clamping force applied by a parking brake, which clamping force is at least partially generated by an electromechanical brake device that includes an electric actuator and additionally by a hydraulic brake device as needed, a hydraulic pressure being supportively active at a brake piston when the hydraulic brake device is actuated, the brake piston being adjusted by a total clamping force composed of an electromechanical clamping force generated by the electric actuator and a hydraulic clamping force generated by the hydraulic brake device, the method comprising:
    ascertaining the hydraulic pressure; and
    assigning the hydraulic pressure a pressure reference path which is compared with an actuator path ascertained from a motor state variable of the actuator, the total clamping force being provided with aid of the electromechanical clamping force in an event that the pressure reference path and the actuator path deviate significantly from each other;
    wherein the actuator path corresponds to a free travel between a reference point, which coincides with a stopping point of the actuator in a retracted out-of-operation state, and a force increase point of the actuator.

9. A parking brake in a vehicle that includes a regulating or control unit for carrying out a method for setting a clamping force applied by a parking brake, which clamping force is at least partially generated by an electromechanical brake device that includes an electric actuator and additionally by a hydraulic brake device as needed, a hydraulic pressure being supportively active at a brake piston when the hydraulic brake device is actuated, the brake piston being adjusted by a total clamping force composed of an electromechanical clamping force generated by the electric actuator and a hydraulic clamping force generated by the hydraulic brake device, the method comprising:
    ascertaining the hydraulic pressure; and
    assigning the hydraulic pressure a pressure reference path which is compared with an actuator path ascertained from a motor state variable of the actuator, the total clamping force being provided with aid of the electromechanical clamping force in an event that the pressure reference path and the actuator path deviate significantly from each other;
    wherein the actuator path corresponds to a free travel between a reference point, which coincides with a stopping point of the actuator in a retracted out-of-operation state, and a force increase point of the actuator.

* * * * *